United States Patent [19]
Koch

[11] Patent Number: 5,778,935
[45] Date of Patent: Jul. 14, 1998

[54] FLEXIBLE REPLACEMENT SECTION FOR IRRIGATION AND WATER PIPE

[76] Inventor: Ruben Koch, 5745 36th Pl., Vero Beach, Fla. 32966

[21] Appl. No.: 617,094

[22] Filed: Mar. 18, 1996

[51] Int. Cl.⁶ .................................................. F16L 55/18
[52] U.S. Cl. ........................ 138/97; 138/109; 138/120
[58] Field of Search ......................... 138/97, 109, 96 R, 138/119, 120, DIG. 8

[56] References Cited

U.S. PATENT DOCUMENTS

| | | | |
|---|---|---|---|
| 3,502,356 | 3/1970 | Schmunk | 138/109 |
| 3,588,148 | 6/1971 | Barsumian | 138/109 |
| 3,612,580 | 10/1971 | Jones | 138/137 |
| 3,773,087 | 11/1973 | Katayama | 138/120 |
| 3,826,521 | 7/1974 | Wilheimsen . | |
| 3,837,685 | 9/1974 | Miller | 138/97 |
| 4,023,834 | 5/1977 | Ewing et al. | 138/130 |
| 4,639,016 | 1/1987 | Rogers et al. | 138/97 |
| 4,763,695 | 8/1988 | Dooley | 138/109 |
| 5,027,862 | 7/1991 | Laybourn . | |
| 5,033,512 | 7/1991 | Abbema . | |
| 5,070,597 | 12/1991 | Holt et al. | 138/103 |
| 5,088,522 | 2/1992 | Rath et al. | 138/119 |

*Primary Examiner*—Denise L. Ferensic
*Assistant Examiner*—James F. Hook
*Attorney, Agent, or Firm*—Robert L. Epstein; Harold James; James & Franklin

[57] ABSTRACT

For connecting the spaced ends of underground irrigation or water pipe, a flexible replacement section with a rigid tubular coupling at each end is employed. Each coupling has an inner diameter equal to the outer diameter of the pipe being connected and is adapted to receive a pipe end therein. After one coupling is aligned with and mounted on one of the pipe ends, the replacement section is flexed so that the other coupling can be aligned with and mounted on the other pipe end as the flexed section is straightened.

4 Claims, 3 Drawing Sheets

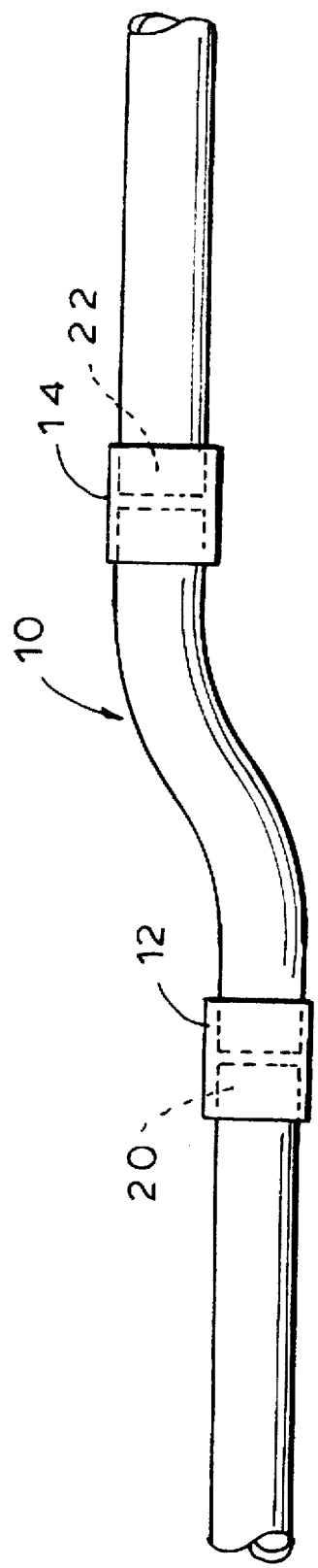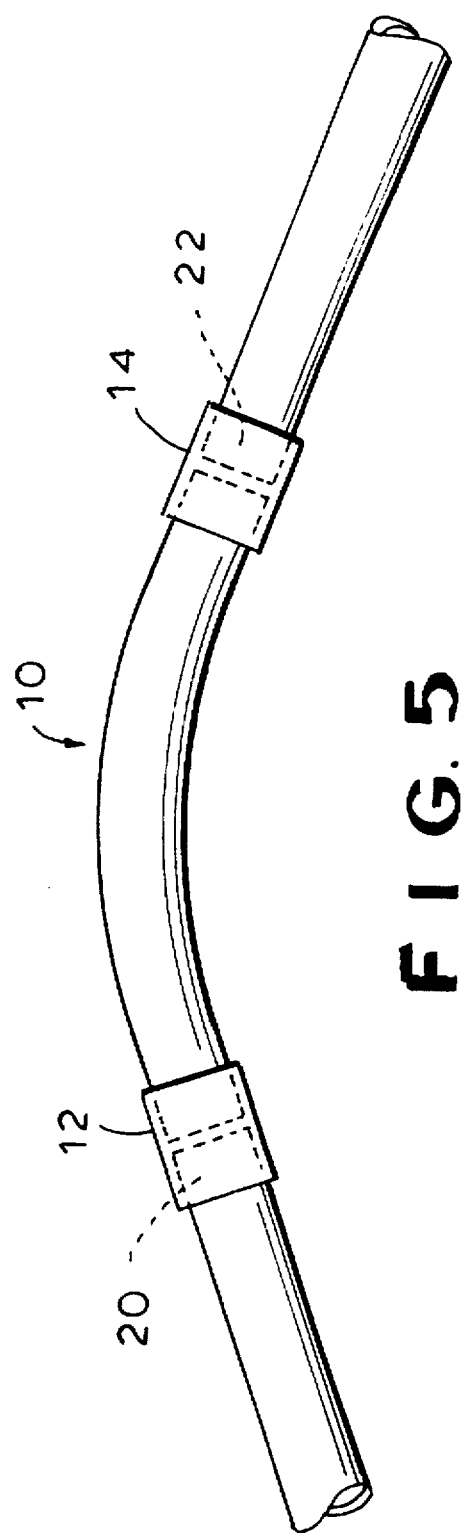

# FLEXIBLE REPLACEMENT SECTION FOR IRRIGATION AND WATER PIPE

The present invention relates to irrigation and water pipe systems and more particularly to a flexible replacement section for connecting the ends of buried irrigation or water pipe after a broken section has been removed.

BACKGROUND OF THE INVENTION

1. Field of the Invention

Rigid pipe made of polyvinylchloride (PVC) is commonly used for irrigation and water systems because of its low cost, ease of installation and durability. However, buried PVC pipe does occasionally break and when this occurs, the broken section must be removed and replaced. Removal of a broken section is quite easy, as the pipe can be cut with a simple hand saw. However, because of the rigidity of the pipe, it is difficult to replace the removed section with a replacement section which can be adequately sealed to the pipe ends.

In particular, if the removed pipe is replaced by a rigid pipe section with a coupling at each end, the overall length of the replacement unit is limited. The length, including the pipe section and couplings, can be at most equal to or slightly longer than the length of the removed section. Greater length would not permit alignment of the replacement unit between the pipe ends.

However, proper mounting of the couplings requires that the pipe ends be inserted within each of the couplings a distance of approximately one inch. Therefore, a rigid replacement unit with a maximum length equal to or slightly longer than that of the removed section is too short for the couplings to adequately receive and seal with both of the pipe ends simultaneously.

2. Description of Related Art

Attempts to overcome this problem have taken two different approaches. One approach utilizes rigid replacement pipe sections with movable couplings. For example, U.S. Pat. No. 3,826,521 issued Jul. 30, 1974 to Wilhelmsen teaches the use of a rigid replacement section with a pair of slideable sleeve couplings at one end. The couplings are initially placed on the irrigation pipe end. The replacement section is aligned and sealed at one end. The couplings are then moved into position over the other end of the replacement section and sealed. A similar method is disclosed in U.S. Pat. No. 5,033,512 issued Jul. 23, 1991 to Abbema which uses telescopically assembled coupling members to vary the effective length of a rigid replacement section. However, in practice, both of these solutions are difficult to impliment good seals require that the couplings fit tightly to the exterior of the pipe ends and tight fitting members which slide along a surface such as that of a pipe tend to jam if any dirt is encountered. Since the irrigation pipes are buried, tight fitting slideable parts can be a problem.

U.S. Pat. No. 5,027,862 issued to Laybourn uses a different approach. It employs a flexible replacement pipe section instead of a rigid section. However, Laybourn teaches the use of drawstrings to attach the ends of the replacement section to the irrigation pipe. Strings obviously cannot provide a seal adequate to contain water at pressures necessary for irrigation.

My invention overcomes these disadvantages. It is simple in construction, easy and quick to install, inexpensive and can be sealed so as to provide excellent joints. In general, it consists of a flexible replacement section with a rigid tubular coupling fixed at each end. Because the section can be flexed, the overall length of the unit can be longer than the distance between the pipe ends by an amount necessary for both couplings to receive the pipe ends to a depth necessary to insure excellent seals.

The flexibility of the section also makes it ideal for connecting misaligned pipe ends. Likewise, curved connections cna be created easily and quickly.

It is therefore a prime object of the present invention to provide a flexible replacement section for buried irrigation or water pipe which is easy and quick to install, inexpensive and results in a strong and permanent repair.

It is another object of the present invention to provide a flexible pipe section which can be used to connect misaligned pipe ends or to create curves.

SUMMARY OF THE INVENTION

In accordance with one aspect of the present invention, apparatus is provided for connecting the spaced ends of a underground pipe, such as after a broken section has been removed. The apparatus includes a flexible pipe section with first and second tubular couplings adapted to be fixedly mounted on each end of the flexible section. Each of the couplings has an inner diameter approximately equal to the outer diameter of the pipe and is adapted to receive one of the pipe ends therein.

The outer diameter of the replacement section is preferably approximately equal to the outer diameter of the pipe.

Each of the couplings includes an internal rib. The rib acts as a stop to limit the insertion depth of the pipe end.

In accordance with another aspect of the present invention, a method is provided for connecting the spaced ends of a underground irrigation or water pipe after a broken section has been removed. A flexible replacement pipe section with first and second tubular couplings, each fixedly mounted to a different end of the pipe section is employed. The method begins with the step of aligning the first coupling to one end of the underground pipe. The first coupling is mounted and sealed on the pipe end with adhesive. The replacement section is flexed so as to permit the second coupling to align with the other end of the underground pipe. Adhesive is applied. The second coupling is received over the other pipe end as the flexible replacement section is straightened.

BRIEF DESCRIPTION OF THE DRAWINGS

To these and to such other objects which may hereinafter appear, the present invention relates to a flexible replacement section for repairing irrigation or water pipe as described in detail in the following specification and recited in the annexed claims, taken together with the accompanying drawings, wherein like numerals relate to like parts and wherein:

FIG. 4 illustrates the use of the present invention to join misaligned pipe ends; and FIG. 5 illustrates the use of the present invention to create a curve.

DESCRIPTION OF PREFERRED EMBODIMENT

Figure 1:
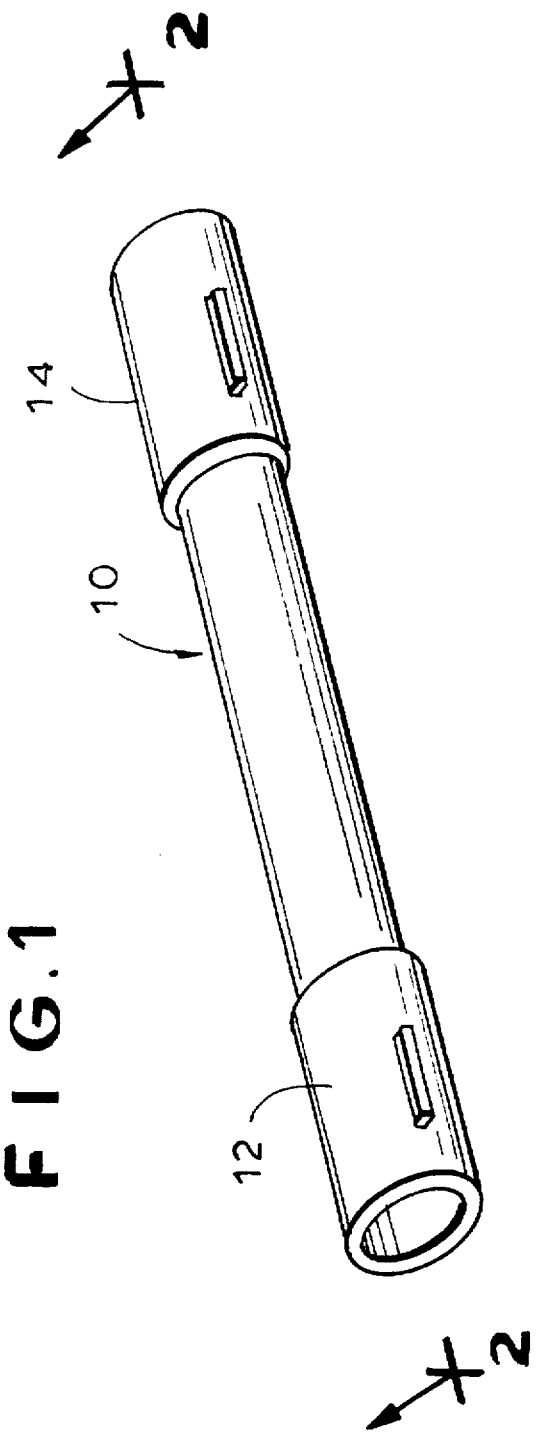
FIG. 1 is a perspective view of the flexible replacement section of the present invention.
Figure 2:
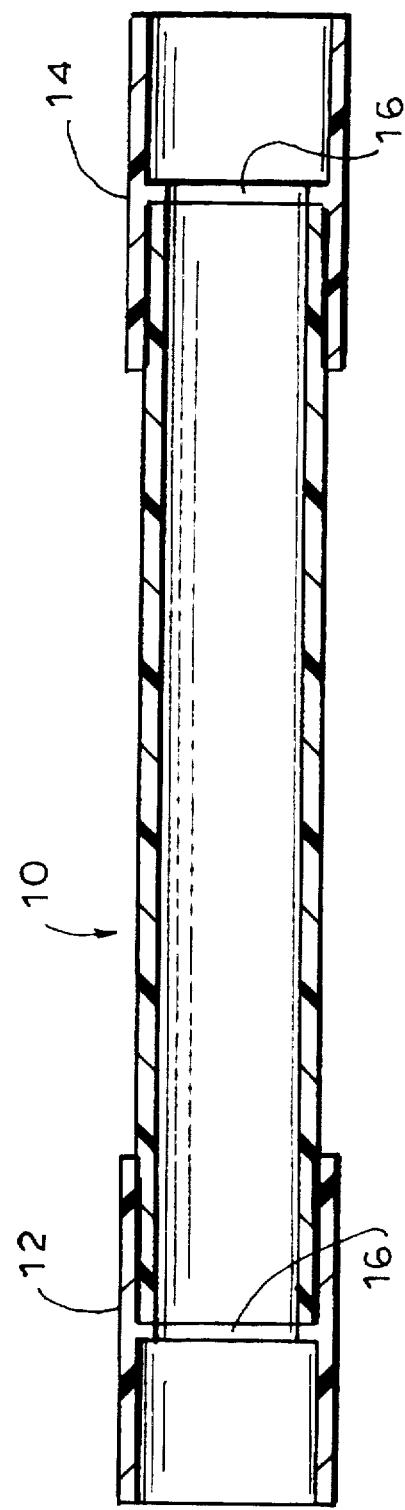
FIG. 2 is a cross-sectional view taken along line 2—2 of FIG. 1.

As illustrated in FIGS. 1 and 2, the present invention is a unit which includes a section of flexible pipe 10 and a pair of rigid plastic tubular couplings 12, 14 each of which is adapted to be mounted on and sealed to a different end of section 10 in a fixed manner, by adhesive or any conventional means. The outer diameter of section 10 is preferrably selected to be the same as the outer diameter of the irrigation or water pipe being repaired.

Section 10 can be any convenient length. It can be made of any material with suitable flexibility which is otherwise appropriate for irrigation or water systems. For example, some of the materials and structures used in the manufacture of flexible garden hose, such a flex PVC or reinforced nylon, may be excellent for this purpose.

Couplings 12, 14 are rigid plastic and may be made of PVC. The length of each coupling should be selected to permit a strong permanent joint with the pipe ends to be received therein. Therefore, for example, for 1 inch. diameter pipe, each pipe end should be received into the coupling to a depth of at least three quarters of an inch.

Each coupling is provided with an internal stop in the form of an internal rib 16. Rib 16 extends in a plane perpendicular to the axis of the coupling at a point approximately half way along the axis. Rib 16 acts to limit the insertion depth of the pipe ends into the coupling. It insures that neither the end of section 10 or the pipe end can be received in the coupling beyond the appropriate depth.

Joints between the couplings and the pipe ends are sealed with adhesive which is applied on the cleaned mating surfaces immediately before the parts are joined. The particular adhesive choosen depends upon the materials involved. For PVC pipe, various adhesive cements are commercially available specifically for this purpose. Other compositions may require different adhesives.

FIGS. 3A–3D illustrate one preferred method of installation of the unit shown in FIG. 1. After the break in the buried irrigation or water pipe is located, the surrounding dirt is removed to expose the break. The section of the underground irrigation or water pipe containing the break, slightly shorter in length than the replacement unit, is removed. The ends 20, 22 of the underground pipe are cleaned and a layer of adhesive cement (not shown) is applied to the outer surface proximate each of the pipe ends.

Figure 3A:
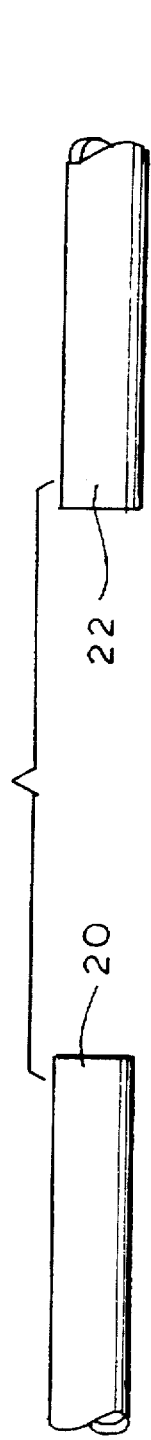
FIGS. 3(A) through 3(D) schematically illustrate the steps in the method of installation of the flexible replacement section.
Figure 3B:
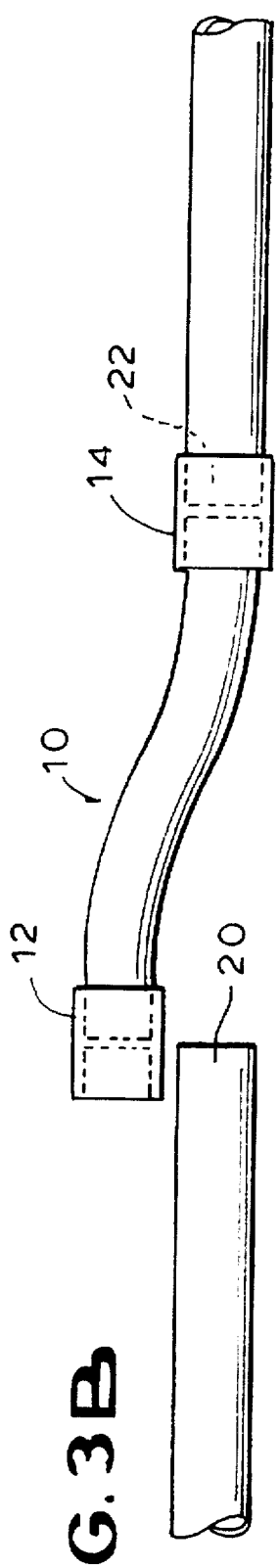
Figure 3C:
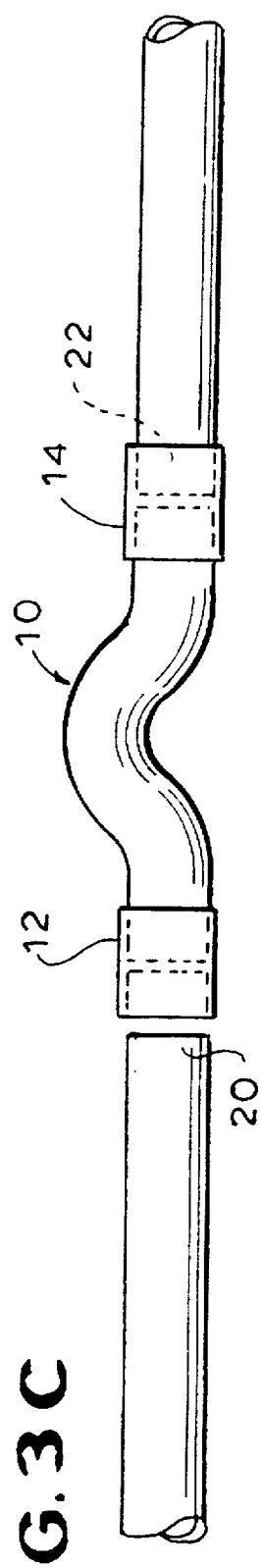
Figure 3D:
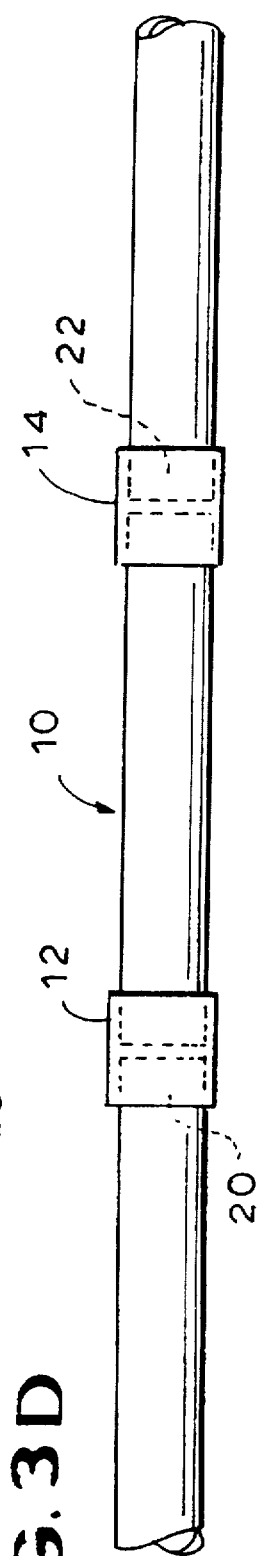

Before the unit is installed, adhesive cement is applied to the interior surface of each coupling. Coupling 14 is aligned with and mounted on pipe end 22 (FIG. 3A). The flexibility of section 10 allows coupling 12 to be positioned out of the way of pipe end 20 (FIG. 3B). Section 10 is now flexed in a "U" shape so as to shorten the effective length of the unit and permit coupling 12 to align with pipe end 20 (FIG. 3C). Coupling 12 is then received over pipe end 20 as section 10 is straightened (FIG. 3D).

The flexibility of the unit also makes it ideal for connecting misaligned pipe sections, as illustrated in FIG. 4, or for creating curves of various contours using sections of pipe connected with one or more of the units as illustrated in FIG. 5. The same installation process is employed, but it may be necessary to choose units of greater length for this application.

It should now be appreciated that the present invention consists of a flexible pipe section with a pair of tubular couplings mounted on each end. The unit connects the ends of irrigation or water pipe sections in a quick, easy, inexpensive and permanent manner.

While only a single preferred embodiment of the present invention is disclosed herein for purposes of illustration, it is obvious that many variations and modifications could be made thereto. For example, the couplings could be made to accept different size pipe ends. It is intended to cover all of these variations and modifications which fall within the scope of the invention, as defined by the following claims:

I claim:

1. Apparatus for repairing an underground irrigation pipe, the apparatus comprising a replacement pipe section for connecting the ends of the irrigation pipe, said section comprising a substantially cylindrical wall with a substantially uniform diameter composed of flexible material and having first and second ends, a single part tubular coupling fixedly mounted to each of said ends, each of said couplings defining a recess adapted to receive and surround an end of the irrigation pipe.

2. The apparatus of claim 1 wherein the outer diameter of said section is approximately equal to the outer diameter of the underground pipe.

3. The apparatus of claim 2 wherein said limiting means comprises an internal rib.

4. The apparatus of claim 1 wherein each of said couplings comprises insertion depth limiting means.

* * * * *